United States Patent
Liang et al.

(10) Patent No.: US 11,498,454 B2
(45) Date of Patent: Nov. 15, 2022

(54) POWER BATTERY COOLING SYSTEM AND METHOD BASED ON SOLAR SUNROOF

(71) Applicant: Volvo Car Corporation, Gothenburg (SE)

(72) Inventors: Haibo Liang, Shanghai (CN); Jia Li, Shanghai (CN); Tao Zhang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 721 days.

(21) Appl. No.: 16/513,787

(22) Filed: Jul. 17, 2019

(65) Prior Publication Data
US 2020/0086763 A1 Mar. 19, 2020

(30) Foreign Application Priority Data
Sep. 17, 2018 (CN) .......................... 20181108001.X

(51) Int. Cl.
*H02J 7/00* (2006.01)
*B60L 58/26* (2019.01)
(Continued)

(52) U.S. Cl.
CPC .............. *B60L 58/26* (2019.02); *B60L 53/51* (2019.02); *B60L 53/60* (2019.02);
(Continued)

(58) Field of Classification Search
CPC .......... B60L 58/26; B60L 53/51; B60L 53/60; H01M 10/443; H01M 10/465;
(Continued)

(56) References Cited

U.S. PATENT DOCUMENTS

2010/0090527 A1* 4/2010 Tarnowsky ........ B60H 1/00428
307/10.7
2017/0267113 A1* 9/2017 Harada ..................... H02J 7/35
(Continued)

FOREIGN PATENT DOCUMENTS

| CN | 2803592 A1 | 7/2014 |
|---|---|---|
| CN | 105896676 B | 6/2018 |
| JP | 2012044813 A | 3/2012 |

OTHER PUBLICATIONS

Jan. 24, 2020 European Search Report issued on International Application No. 19184697.

*Primary Examiner* — Zixuan Zhou
(74) *Attorney, Agent, or Firm* — Clements Bernard Walker; Christopher L. Bernard

(57) ABSTRACT

A power battery cooling system of an electric vehicle, including: a cooling circuit configured for cooling a power battery of the electric vehicle; a solar sunroof; and a sunroof control unit configured for controlling the operation of the cooling circuit and the electric energy output of the solar sunroof; wherein the sunroof control unit is configured to start a power battery cooling operation based on the solar sunroof in the condition that the power battery is not in a high voltage output state and the temperature of the power battery is higher than a temperature threshold, the power battery cooling operation including: controlling the solar sunroof to output electric energy to the cooling circuit so that the cooling circuit performs the cooling of the power battery using the electric energy from the solar sunroof.

11 Claims, 2 Drawing Sheets

(51) Int. Cl.
    *H02S 40/30*     (2014.01)
    *H02S 40/38*     (2014.01)
    *H02S 40/42*     (2014.01)
    *H01M 10/613*     (2014.01)
    *H01M 10/625*     (2014.01)
    *H01M 10/63*     (2014.01)
    *B60L 53/60*     (2019.01)
    *B60L 53/51*     (2019.01)
    *H01M 10/44*     (2006.01)
    *H01M 10/46*     (2006.01)
    *H01M 10/48*     (2006.01)
    *H02J 7/35*     (2006.01)
    *B60J 7/043*     (2006.01)
    *B60K 6/22*     (2007.10)

(52) U.S. Cl.
CPC ....... *H01M 10/443* (2013.01); *H01M 10/465* (2013.01); *H01M 10/486* (2013.01); *H01M 10/613* (2015.04); *H01M 10/625* (2015.04); *H01M 10/63* (2015.04); *H02J 7/35* (2013.01); *H02S 40/30* (2014.12); *H02S 40/38* (2014.12); *H02S 40/425* (2014.12); *B60J 7/043* (2013.01); *B60K 6/22* (2013.01); *B60Y 2200/91* (2013.01); *B60Y 2200/92* (2013.01); *B60Y 2300/91* (2013.01); *B60Y 2306/05* (2013.01); *B60Y 2400/216* (2013.01); *H01M 2220/20* (2013.01); *Y02E 10/50* (2013.01)

(58) Field of Classification Search
CPC .. H01M 10/486; H01M 10/613; H01M 10/63; H01M 2220/20; H02S 40/30; H02S 40/38; H02S 40/425; B60Y 2200/91; B60Y 2200/92; B60Y 2300/91; B60Y 2306/05; B60Y 2400/216; Y02E 10/50
USPC .................. 320/109, 101; 62/235.1; 307/104
See application file for complete search history.

(56) References Cited

U.S. PATENT DOCUMENTS

2018/0099577 A1*   4/2018   Nagata .................... B60L 58/13
2018/0215231 A1*   8/2018   Porras ................ B60H 1/00885

* cited by examiner

POWER BATTERY COOLING SYSTEM AND METHOD BASED ON SOLAR SUNROOF

CROSS-REFERENCE TO RELATED APPLICATION

The disclosure claims the benefit of priority of co-pending Chinese Patent Application No. 201811080011.X, filed on Sep. 17, 2018, and entitled "POWER BATTERY COOLING SYSTEM AND METHOD BASED ON SOLAR SUNROOF," the contents of which are incorporated in full by reference herein.

TECHNICAL FIELD

The disclosure relates to a power battery cooling system and method based on a solar sunroof, the system and method being applicable in an electric vehicle.

BACKGROUND

Nowadays there are various electric vehicles, such as pure electric vehicles, hybrid power vehicles, etc. With respect to traditional fuel vehicles, electric vehicles have less effect on environment and thus their prospects are widely valued. Power batteries of existing electric vehicles have strict requirements on operation temperature. In the condition that the power battery temperature is over high, the power battery is prohibited from outputting energy for the purpose of protecting itself. When a user parks an electric vehicle under sunlight for a long time, the temperature inside the vehicle and the internal temperature of the power battery will be inevitably increased, which may likely results in an internal temperature of the power battery higher than a maximum value which allows vehicle starting, and in this condition the vehicle cannot be started. Thus, the power battery is generally equipped with a cooling system for maintain the temperature of the power battery within a predetermined range. The cooling system of the power battery operates using the electric energy of a low voltage assistant battery of the vehicle or the electric energy of the power battery. In a high temperature environment, a large amount of energy of the assistant battery or the power battery will be consumed by the cooling system for cooling the power battery, which results in quick decreasing of battery energy level, and thus properties of other energy consuming devices of the vehicle or the remaining driving mileage of the power battery will be affected. Further, in the condition that the power battery is cooled by only the assistant battery, when the energy level is not sufficient, the temperature of the power battery may not be decreased to be lower than the maximum value that allows vehicle starting, and the vehicle is thus cannot be started.

On the other hand, now some vehicles are equipped with a solar sunroof which comprises a solar cell battery under the glass of a sunroof. Currently, the electric energy converted from solar energy gathered by the solar sunroof is mainly used for driving a ventilation system to run continuously to maintain a comfortable temperature environment inside the vehicle, to expel harmful gases which are emitted from vehicle components under high temperature, and to prolong the service life of the interior decoration and vehicle electrics. In addition, the electric energy generated by the solar sunroof may also be sued for charging the assistant battery of the vehicle.

SUMMARY

An object of the disclosure is to provide a power battery cooling system which can cool down of the power battery effectively by using the electric energy generated by the solar sunroof.

For this end, the disclosure provides in one aspect a power battery cooling system of an electric vehicle comprising: a cooling circuit configured for cooling a power battery of the electric vehicle; a solar sunroof; and a sunroof control unit configured for controlling the operation of the cooling circuit and the electric energy output of the solar sunroof; wherein the sunroof control unit is configured to start a power battery cooling operation based on the solar sunroof in the condition that the power battery is not in a high voltage output state and the temperature of the power battery is higher than a temperature threshold, the power battery cooling operation comprising: controlling the solar sunroof to output electric energy to the cooling circuit so that the cooling circuit performs the cooling of the power battery using the electric energy from the solar sunroof.

According to a possible embodiment of the disclosure, the sunroof control unit is configured to receive information about a core temperature of the power battery, and to allow the power battery cooling operation to be started when the core temperature is higher than a core temperature threshold.

According to a possible embodiment of the disclosure, the sunroof control unit is configured to receive information about the core temperature of the power battery during the power battery cooling operation, and to terminate the power battery cooling operation when the core temperature becomes lower than a predetermined temperature level.

According to a possible embodiment of the disclosure, the sunroof control unit is configured to set the solar sunroof in a state for charging an assistant battery of the electric vehicle when the received core temperature is not higher than the core temperature threshold.

According to a possible embodiment of the disclosure, the sunroof control unit is configured to set the solar sunroof in a state for charging an assistant battery of the electric vehicle or in a standby state when the power battery is in a high voltage output state.

According to a possible embodiment of the disclosure, the sunroof control unit is configured to receive information about the voltage or the energy level of the assistant battery, and to allow the assistant battery be charged using the electric energy of the solar sunroof when the sensed voltage or energy level of the assistant battery is lower than a corresponding threshold.

According to a possible embodiment of the disclosure, the sunroof control unit is configured to receive information about whether there is failure in the assistant battery, and to prohibit charging the assistant battery by the electric energy of the solar sunroof when there is failure in the assistant battery.

According to a possible embodiment of the disclosure, the cooling circuit comprises a coolant tank, a cooling pump, a radiator and a cooling unit which is arranged inside the power battery, the cooling pump is configured to draw coolant from the coolant tank and to pump the coolant into the cooling unit to allow the coolant return back to the coolant tank through the radiator after the coolant exchanges heat in the cooling unit, and the cooling pump is further configured to be driven by the electric energy of the solar sunroof in the power battery cooling operation.

According to a possible embodiment of the disclosure, the sunroof control unit is configured to receive information about whether there is failure in the cooling circuit, and to prohibit the power battery cooling operation based on the solar sunroof when there is failure in the cooling circuit.

According to a possible embodiment of the disclosure, the sunroof control unit is configured to check the output power level of the solar sunroof at a predetermined time interval, and to allow starting of the power battery cooling operation when the output power level of the solar sunroof is not lower than a minimum enablement value.

According to a possible embodiment of the disclosure, the sunroof control unit is configured to receive information about whether there is failure in the power battery, and to prohibit the power battery cooling operation based on the solar sunroof when there is failure in the power battery.

According to a possible embodiment of the disclosure, the sunroof control unit is configured to receive information about the outside environment temperature, and to prohibit the power battery cooling operation based on the solar sunroof when the outside environment temperature is lower than a predetermined value.

The disclosure in another aspect provides a power battery cooling method used in an electric vehicle, possible performed using the power battery cooling system described above, the method comprising: checking the operation state of a power battery of the vehicle and the temperature of the power battery; and in the condition that the power battery is not in the high voltage output state and the temperature of the power battery is higher than a temperature threshold, controlling the solar sunroof to output electric energy to the cooling circuit so that the cooling circuit performs the cooling of the power battery using the electric energy from the solar sunroof.

According to the disclosure, the electric energy generated from solar energy absorbed by the solar sunroof is used not only for charging the in-vehicle assistant battery but also, and more importantly, for decreasing the temperature of the power battery. The energy for cooling the power battery comes from solar energy, so it does not need to consume the energy of the vehicle. In addition, no new component is added since the existing cooling system of the power battery is used here. Further, the power battery temperature can be maintained in a proper range, which helps to prolong the service life of the power battery.

DESCRIPTION OF EMBODIMENTS

An electric vehicle comprises a high voltage power battery (with an output voltage of generally 200V or more, in some cases 1000V or more) and a low voltage assistant battery (with an output voltage of 12V, 24V, etc.). The power battery is used for energizing a driving motor of the vehicle. The driving motor itself, or together with an engine, forms a power source of the vehicle. The low voltage assistant battery is used for energizing other electricity consuming devices (control system, illumination system, signal system, instrument system, electrics, etc.) of the vehicle.

Figure 1:
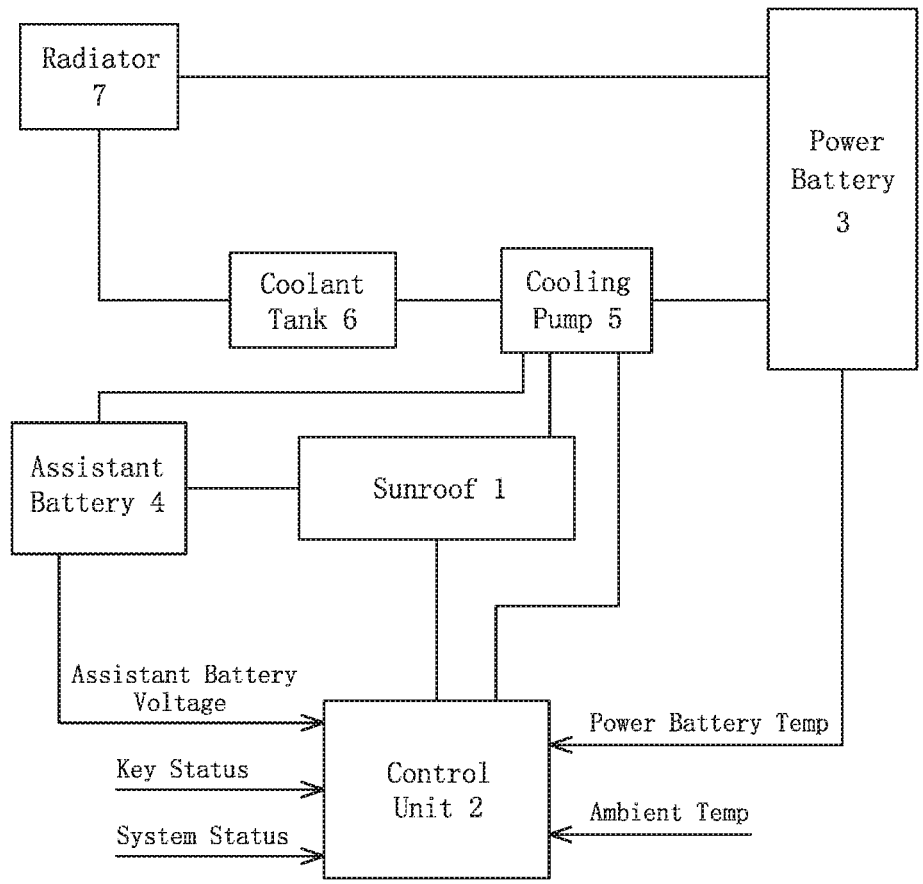
FIG. 1 is a schematic block diagram of a power battery cooling system based on solar sunroof according to an embodiment of the disclosure.

The disclosure proposed to use the electric energy generated by a solar sunroof in the cooling of the power battery in the electric vehicle. For this end, a power battery cooling system based on the solar sunroof according to a possible embodiment of the disclosure is schematically shown in FIG. 1. The power battery cooling system mainly comprises a solar sunroof 1 which is able to convert the solar energy into electric energy which can be used for cooling a power battery 3 of the electric vehicle, and a sunroof control unit 2 which is electrically connected with the solar sunroof 1 and the power battery 3, is able to receive information about the status of the solar sunroof 1 and the power battery 3, and is able to control the use of the electric energy generated by the solar sunroof 1 (including cooling the power battery 3).

The sunroof control unit 2 is also electrically connected with an assistant battery 4 of the electric vehicle, is able to receive information about the state of the assistant battery 4, and is able to control the electric energy generated by the solar sunroof 1 to be used for charging the assistant battery 4. When necessary, the assistant battery 4 may also be used for cooling the power battery 3.

The power battery cooling system further comprises a cooling circuit in which a coolant (such as water) tank 6, a cooling pump 5, the power battery 3 and a radiator 7 are arranged in sequence, wherein the cooling pump 5 is electrically connected with the solar sunroof 1 and the assistant battery 4 so as to be driven by the electric energy from the solar sunroof 1 and/or the assistant battery 4. As an option, the cooling pump 5 may be also driven by the electric energy from the power battery 3.

The sunroof control unit 2 is further electrically connected with the cooling pump 5 so as to control the operation of the cooling pump 5. The cooling pump 5 is connected with the coolant tank 6 at an upstream location via an inlet pipeline and is connected with an inlet of a cooling unit (such as heat exchanger) of the power battery 3 at a downstream location. In operation, the cooling pump 5 draws coolant from the coolant tank 6 and pumps the coolant to the cooling unit of the power battery 3 to achieve the cooling of the power battery 3. An outlet of the cooling unit of the power battery 3 is connected with the coolant tank 6 via a backflow pipeline so that the coolant can return back to the coolant tank 6 after the coolant is heated up by heat exchanging with the cooling unit of the power battery 3. The radiator 7 is arranged in the backflow pipeline for lowering down the temperature of the high temperature coolant.

In an initial state, the sunroof control unit 2 is configured to check the output power level of the solar sunroof 1 at a certain time interval. If the output power level of the solar sunroof 1 is lower than a minimum enablement value, the sunroof control unit 2 controls the solar sunroof 1 not to output electric energy. If the output power level of the solar sunroof 1 equals to or is higher than the minimum enablement value, the sunroof control unit 2 further checks whether the power battery 3 is in a high voltage output state, for example, by checking the position of the vehicle key in the ignition switch.

If the power battery 3 is in the high voltage output state, the sunroof control unit 2 checks the voltage state of the assistant battery 4 (the voltage state of the assistant battery 4 reflects the energy level of it). If the voltage of the assistant battery 4 is lower than a threshold, the sunroof control unit 2 controls the solar sunroof 1 to charge the assistant battery 4; and if the voltage of the assistant battery 4 is not lower than the threshold, the control logic goes back to the initial state. Alternatively, when the power battery 3 is in the high voltage output state, the solar sunroof 1 may not be used to charge the assistant battery 4.

On the other hand, if the power battery 3 is not in the high voltage output state (for example, when the vehicle is shutoff and parked, or in a pure engine driving state for a hybrid power vehicle, etc.), the sunroof control unit 2 detects the temperature of the power battery 3, for example, the core temperature Tc. If the temperature of the power battery 3 (for example, the core temperature Tc) is not higher than a threshold T1, the sunroof control unit 2 determines again whether to charge the assistant battery 4 by the electric energy of the solar sunroof 1; and if the temperature of the power battery 3 (for example, the core temperature Tc) is higher than the threshold T1, the sunroof control unit 2 controls the cooling pump 5 to start working, and the solar sunroof 1 supplies electric energy to the cooling pump 5, i.e., the cooling pump 5 functions to cool down the power battery 3 by using the electric energy generated by solar sunroof 1. Then, the sunroof control unit 2 monitors the core temperature Tc, and stops the operation of the cooling pump 5 to return back to the initial state when the core temperature Tc becomes lower than a threshold T2 (T2 is lower than T1 by a certain temperature level).

It can be seen that, according to the disclosure, when the power battery 3 of the vehicle is not in the high voltage output state, and the temperature of the power battery 3 is too high, the electric energy generated by the solar sunroof 1 is used for cooling the power battery 3, so it does not need to consume the electric energy of the assistant battery 4. In other conditions, the electric energy generated by the solar sunroof 1 can be used for charging the assistant battery 4 (or for driving the vehicle ventilation/air conditioning system, etc.). The cooling pump 5, the coolant tank 6, the radiator 7 and the cooling circuit may be those in the existing cooling system of the power battery, so no new component needs to be added.

The sunroof control unit 2 may also receive corresponding information, such as system state information, outside environment temperature information, etc., for performing supplementary judgment. The system state information includes information about the status of the power battery 3, the assistant battery 4 and actuation components (like the cooling pump 5). If there is any failure, such as insulation failure, in the power battery 3, there is any failure in components (such as the cooling pump 5) of the cooling circuit, or there is any failure in the assistant battery 4 that prohibits charging, the charging or cooling function based on the solar sunroof 1 will not be activated even if other conditions are met. The outside environment temperature information can be taken into consideration in the control logic. When the vehicle has run for a long time in cold weather and then is stopped and shutoff, the core temperature of the power battery is very high; but the cooling function based on the solar sunroof will not be activated since the environment temperature is low. Now the power battery should keep its temperature as warm possible.

The sunroof control unit 2 may be formed as an individual control element, or be integrated in the vehicle ECU to form a module of the vehicle ECU.

Based on the principle of the disclosure, those skilled in the art can make various modifications to the power battery cooling system described above.

Figure 2:
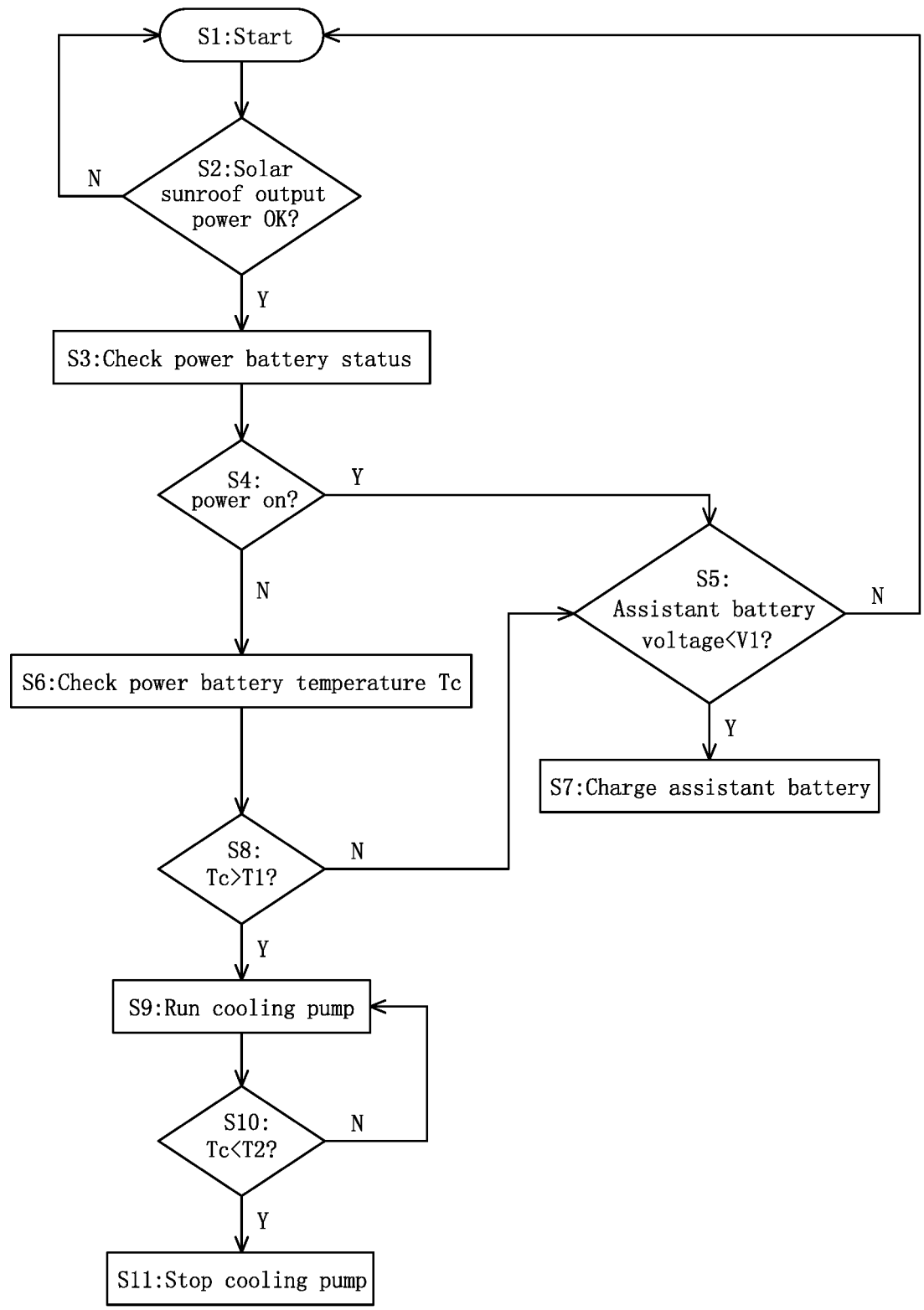
FIG. 2 is a schematic flow chart of a power battery cooling method based on solar sunroof according to an embodiment of the disclosure.

The disclosure also relates to a power battery cooling method based on the solar sunroof in the electric vehicle, a possible procedure of which is schematically shown in FIG. 2. Such a procedure will be described below.

First, in Step S1, the procedure is started.

Then, in Step S2, it judges whether the output power level of the solar sunroof equals to or is higher than a minimum enablement value. If the judge result is "No", the procedure returns back to Step S1; and if the judge result is "Yes", the procedure goes to Step S3.

In Step S3, it checks the working state of the power battery.

Then, in Step S4, it judges whether the power battery is in the high voltage output state. If the judge result is "Yes", the procedure goes to Step S5; and if the judge result is "No", the procedure goes to Step S6.

In Step S5, it judges whether the voltage of the assistant battery of the vehicle is lower than a threshold V1. If the judge result is "No", the procedure returns back to Step S1; and if the judge result is "Yes", the procedure goes to Step S7. In Step S7, the electric energy generated by the solar sunroof is used for charging the assistant battery. According to a possible option, when the power battery is in the high voltage output state, Steps S5 and S7 can be substituted by a step in which the solar sunroof is in a standby state, not outputting electric energy.

In Step S6, it detects the temperature of the power battery, such as the core temperature Tc. Then, in Step S8, it judges whether the temperature of the power battery (such as the core temperature Tc) is higher than a threshold T1. If the judge result is "No", the procedure goes to Step S5; and if the judge result is "Yes", the procedure goes to Step S9.

In Step S9, the electric energy generated by the solar sunroof is used for cooling the power battery, for example, by actuating the cooling pump.

Then, in Step S10, it judges whether the temperature of the power battery (such as the core temperature Tc) is lower than a threshold T2 (T2<T1). If the judge result is "No", the procedure returns back to Step S9; and if the judge result is "Yes", the procedure goes to Step S11.

In Step S11, the cooling of the power battery is terminated, for example, by stopping the cooling pump.

Based on the principle of the disclosure, those skilled in the art can make various modifications to the power battery cooling method described above, especially to the details in the steps. For example, the control logic related with information about the system state information and the outside environment temperature can be implemented in the method.

It can be seen that, according to the disclosure, the electric energy generated from the solar energy absorbed by the solar sunroof can be used for charging the assistant battery of the vehicle, and more importantly can be used for lowering down the temperature of the power battery. Since the energy for cooling the power battery comes from solar energy, no energy of the vehicle will be consumed, so the using efficiency of the electric energy of the electric vehicle can be increased.

Further, according to the disclosure, the existing the power battery cooling system is used, and no more new component needs to be added. The power battery temperature can be guaranteed to be maintained in a proper range, which is advantageous for the service life of the power battery.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A power battery cooling system of an electric vehicle, comprising:

a cooling circuit configured for cooling a power battery of the electric vehicle;

a solar sunroof; and a sunroof control unit configured for controlling the operation of the cooling circuit and the electric energy output of the solar sunroof;

wherein the sunroof control unit is configured to start a power battery cooling operation based on the solar sunroof in the condition that the power battery is not in a high voltage output state and the temperature of the power battery is higher than a temperature threshold, the power battery cooling operation comprising: controlling the solar sunroof to output electric energy to the cooling circuit so that the cooling circuit performs the cooling of the power battery using the electric energy from the solar sunroof; and wherein the sunroof control unit is configured to check an output power level of the solar sunroof at a predetermined time interval, and to allow starting of the power battery cooling operation when an output power level of the solar sunroof is not lower than a minimum enablement value.

2. The power battery cooling system of claim 1, wherein the sunroof control unit is configured to receive information about a core temperature of the power battery, and to allow the power battery cooling operation to be started when the core temperature is higher than a core temperature threshold.

3. The power battery cooling system of claim 2, wherein the sunroof control unit is configured to receive information about the core temperature of the power battery during the power battery cooling operation, and to terminate the power battery cooling operation when the core temperature becomes lower than a predetermined temperature level.

4. The power battery cooling system of claim 2, wherein the sunroof control unit is configured to set the solar sunroof in a state for charging an assistant battery of the electric vehicle when the received core temperature is not higher than the core temperature threshold.

5. The power battery cooling system of claim 1, wherein the sunroof control unit is configured to set the solar sunroof in a state for charging an assistant battery of the electric vehicle or in a standby state when the power battery is in a high voltage output state.

6. The power battery cooling system of claim 4, wherein the sunroof control unit is configured to receive information about the voltage or the energy level of the assistant battery, and to allow the assistant battery be charged using the electric energy of the solar sunroof when the sensed voltage or energy level of the assistant battery is lower than a corresponding threshold.

7. The power battery cooling system of claim 4, wherein the sunroof control unit is configured to receive information about whether there is failure in the assistant battery, and to prohibit charging the assistant battery by the electric energy of the solar sunroof when there is failure in the assistant battery.

8. The power battery cooling system of claim 1, wherein the cooling circuit comprises a coolant tank, a cooling pump, a radiator and a cooling unit which is arranged inside the power battery, the cooling pump is configured to draw coolant from the coolant tank and to pump the coolant into the cooling unit to allow the coolant return back to the coolant tank through the radiator after the coolant exchanges heat in the cooling unit, and the cooling pump is further configured to be driven by the electric energy of the solar sunroof in the power battery cooling operation.

9. The power battery cooling system of claim 8, wherein the sunroof control unit is configured to receive information about whether there is failure in the cooling circuit, and to prohibit the power battery cooling operation based on the solar sunroof when there is failure in the cooling circuit.

10. The power battery cooling system of claim 1, wherein the sunroof control unit is configured to receive information about whether there is failure in the power battery, and to prohibit the power battery cooling operation based on the solar sunroof when there is failure in the power battery; and/or the sunroof control unit is configured to receive information about the outside environment temperature, and to prohibit the power battery cooling operation based on the solar sunroof when the outside environment temperature is lower than a predetermined value.

11. A power battery cooling method used in an electric vehicle, the method comprising:

checking an operation state of a power battery of the vehicle and a temperature of the power battery; and in the condition that the power battery is not in a high voltage output state and the temperature of the power battery is higher than a temperature threshold, controlling a solar sunroof to output electric energy to a cooling circuit so that the cooling circuit performs cooling of the power battery using electric energy from the solar sunroof; and checking an output power level of the solar sunroof at a predetermined time interval, and allowing starting of a power battery cooling operation when an output power level of the solar sunroof is not lower than a minimum enablement value.

* * * * *

UNITED STATES PATENT AND TRADEMARK OFFICE
CERTIFICATE OF CORRECTION

| | | |
|---|---|---|
| PATENT NO. | : 11,498,454 B2 | |
| APPLICATION NO. | : 16/513787 | |
| DATED | : November 15, 2022 | |
| INVENTOR(S) | : Haibo Liang, Jia Li and Tao Zhang | |

It is certified that error appears in the above-identified patent and that said Letters Patent is hereby corrected as shown below:

On the Title Page

Item (30), Foreign Application Priority Data:
Correct Foreign Priority Application Number from "20181108001.X" to "201811080011.X"

Signed and Sealed this
Eleventh Day of June, 2024

Katherine Kelly Vidal
*Director of the United States Patent and Trademark Office*